Patented Dec. 23, 1930

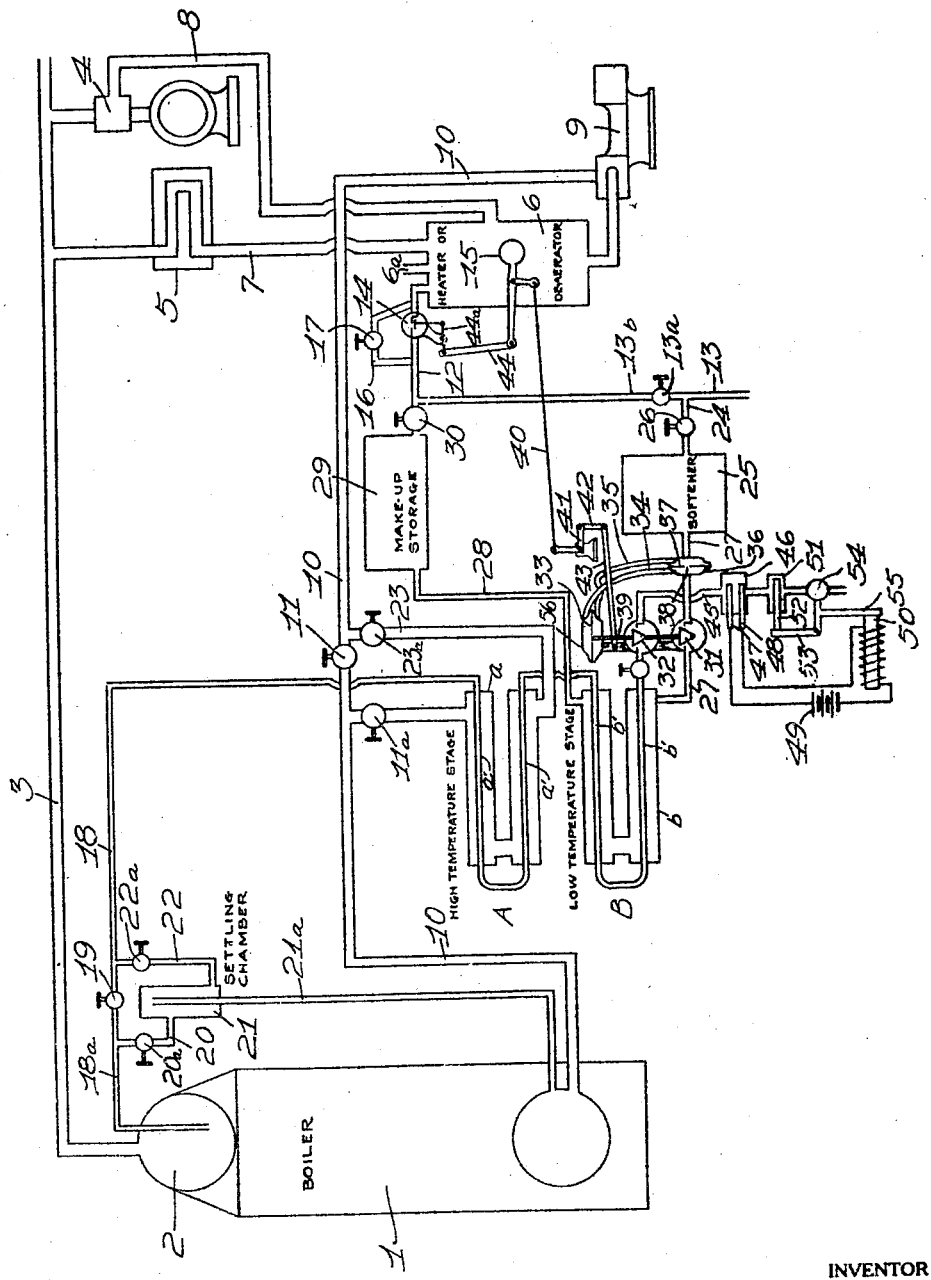

1,786,113

UNITED STATES PATENT OFFICE

ROY O. HENSZEY, OF OCONOMOWOC, WISCONSIN

PROCESS AND MEANS FOR PURIFYING BOILER WATER

Application filed November 8, 1926. Serial No. 147,122.

My invention relates to a process and means for purifying boiler water, such as that used in boilers in steam power plants, etc., and it consists in the constructions hereinafter set forth, and the steps to carry out the invention. The present application is a continuation in part of my pending applications, Serial No. 725,531, filed July 11, 1924, and Serial No. 17,413, filed March 21, 1925. The term "boiler water" is designed to be generic; that is to say, it is designed to include water which is already in the boiler, as well as boiler feed water, and water withdrawn from the boiler so long as it is substantially under boiler pressure.

It is well known by power plant operators and users of water softening devices that nearly every type of water softener feeds some soluble matter, usually sodium sulphate, into the boiler, where any sulphate hardness appears. Certain types of water softeners feed to the boiler, in addition, sodium carbonate, wherever other softening devices precipitate carbonates out of the water entirely. Raw untreated water as well as partially softened water will pass to the boiler impurities that will precipitate and cause foam, mud or scale.

In the operation of the ordinary steam boiler plant, water is continuously fed to the boiler, and nearly pure steam is taken from the boiler, with the result that the soluble salts and other impurities concentrate in the boiler. This concentration has several bad effects. First, it causes the priming of the water out of the boiler into the steam line, where the water on evaporating leaves the dry, soluble salts. This causes trouble in steam driven machinery and other steam using equipment. Second, it is generally accepted as a fact that certain of these soluble salts, particularly sodium carbonate, causes embrittlement of the steel plates of the boiler. Third, it is a well known fact that dissolved and suspended gases, such as oxygen, are passed with the boiler feed water into boilers. These gases cause corrosion and pitting in boilers and steam lines and devices fed with steam from the boiler. Fourth, the precipitated impurities form scale or deposits on the heating surfaces of the boiler. The pecipitated impurities together with soluble impurities cause fluctuation of water level in the boiler.

An object of my invention is to provide a purifying process by means of which the quantity of foreign matter, such as soluble, suspended, or precipitated salts, oil, etc., contained in the boiler, is maintained at a minimum, thereby reducing the formation of scale, foreign deposits, embrittlement, dirty steam and other attendant evils.

A further object of my invention is to provide a purifying process by means of which the boiler feed water is de-aerated.

A further object of my invention is to provide means for accomplishing the deconcentration and de-aerating without any appreciable loss of heat, and in such a manner that the process may be substantially continuous; that is to say, the de-aerating in one portion of the apparatus may be going on while the deconcentration is proceeding in another portion of the apparatus.

A further object of my invention is to provide a process which may be installed at a relatively low cost and which may be used in connection with any ordinary water softener, and especially with base exchange softeners, to remove the soluble salts delivered by them.

A further object is to make more practical the treatment of water within steam boilers.

A further object of my invention is to provide a means of heat transfer from the withdrawn water to the make-up water and boiler feed water that will practically prevent scale or deposits in the heat exchanger.

A further object of my invention is to provide a means of heat transfer whereby the condensate returns and other heated boiler feed water can be used for cooling whereby the cold make-up water will be relieved of part of the cooling of the withdrawn water, thereby increasing the withdrawal capacity of the means without appreciable loss of heat.

A further object of my invention is to minimize the heat lost in withdrawn water, and to provide means of regulating the withdrawal according to the quantity of make-up water added to the feed water system, by using cold make-up water as a cooling medium in the last stage of cooling.

A further object of my invention is to withdraw water in proportion to an increase or decrease in the degree of concentration within the boiler.

A further object of my invention is to provide a means for joining the make-up and returns streams so that they will function best for cooling withdrawn water and at the same time provide best for de-aerating and otherwise conditioning the water, and regulating the flow of the above mentioned streams of water.

A further object is to minimize the loss of water permanently withdrawn from the boiler to accomplish a certain degree of deconcentration, by causing the degree of concentration in the permanently withdrawn water to be increased over that in the boiler, by impurities drawn from within the boiler.

Other objects and advantages will appear in the following specification, and the novel features of the invention will be particularly pointed out in the appended claims.

My invention is illustrated in the accompanying drawings, forming part of this application, in which The figure is a diagrammatic view illustrating one embodiment of my invention.

Referring now to the drawing, I have shown therein a boiler which I have indicated in general at 1 and which is provided with a drum 2. Extending from this drum is a pipe 3, which leads to the steam-consuming devices, such as an engine, shown diagrammatically at 4, or a heater, as shown at 5. The condensed steam "returns" from the heater 5 pass on to a feed water heater 6 by means of the pipe 7, while the exhaust steam from the engine 4 passes to the feed water heater by means of the pipe 8. A boiler feed pump 9 draws water from the heater 6 and can discharge it directly into the boiler 1 through a pipe 10 when the valve 11, which controls this pipe, is open. In ordinary practice, some of the steam which leaves the boiler is not returned to the boiler, and, therefore, provision is made to supply "make-up" water to the heater 6 through a pipe 12 leading from a cold water supply pipe 13. The pipe 12 is controlled by a valve 14 which is actuated by a float 15. A by-pass 16, which is controlled by a valve 17, permits of manual control of the water feed into the heater 6. The latter is provided with a vent pipe 6a through which air, and possibly steam, is vented out of the heater, so that the latter in effect is a de-aerator.

The returns usually constitute the greater part of the boiler feed water, and are usually nearly pure water. Some impurities can leak into the circuit, but usually nearly all the impurities are introduced into the circuit in the added make-up water. The impurities fed with the make-up water concentrate in the boiler. If boiler water containing concentrated impurities is withdrawn from the boiler and replaced by comparatively pure make-up water the concentration will be reduced. By a proper exchange of concentrated boiler water for fresh make-up water the concentration can be reduced to and held at a practically harmless degree. This is accomplished by my invention.

Referring again to the drawing, I have shown a pipe made up of sections 18, 18a leading from the drum 2 to the first stage A of a heat interchanger. The pipe 18, 18a is controlled by a valve 19, and normally this valve is closed. Water from the boiler, however, may be drawn off through the pipe 20, into a settling chamber 21, and from thence passes by the pipe 22 and the pipe 18 to the stage A of the heat interchanger. Valves 20a and 22a are provided for the pipes 20 and 22, respectively.

The heat interchanger is divided into two sections, A and B, respectively, corresponding to two stages of temperature. Any suitable arrangement for interchanging heat may be used. I have indicated diagrammatically a heat interchanger consisting of exterior pipes which are connected in series and which have interior pipes running therethrough. As will be seen from the drawing, the exterior pipes $a$ of the heater A which are connected in series are connected by means of a pipe 23 with the pipe 10, a valve $23^a$ controlling the pipe 23. The pipe 18 is connected with the interior pipes $a'$ and the latter are connected with the interior pipes $b'$ of the temperature stage B.

At 24 I have shown a pipe leading from the supply pipe 13 to a water softener 25 through a valve 26. This water softener may be of any suitable type and it is connected by means of a pipe 27 with the exterior pipe $b$ of the low temperature stage B. The latter is connected by a pipe 28 to the make-up storage tank 29. A valve 30 controls communication between the make-up storage tank 29 and the pipe 12.

In order to control the operation of the device automatically, in the manner to be explained later, I may provide the apparatus shown diagrammatically near the bottom of the figure. At 31 I have shown a valve for controlling the make-up water inlet to the low temperature stage B of the heat interchanger, while a valve 32 controls the withdrawn boiler water outlet from the low temperature stage. These two valves may be actuated by a diaphragm 33 in a chamber which communicates by pipes 34 and 35 with the opposite sides of a casing 36 having a diaphragm 37 provided with an orifice 38. The valves 31 and 32 are on a common valve stem 39. This stem may be actuated by a movement of the float 15 through the medium of the rod 40, the bell crank lever 41, the link 42, and the lever 43 to which the stem 39 is connected. The float 15 may also control the valve 14 through the medium of the link 44 and the lever 44a.

The withdrawn boiler water outlet 45 from the low temperature stage of the heat interchanger has connected therewith a chamber 46 in which are electrodes 47 and 48, one of which is connected with a battery 49 and the other with a solenoid 50 which is connected on its opposite side to the battery.

The withdrawn boiler water outlet 45 may also communicate with a chamber 51 containing a thermostatic element 52 arranged to operate a lever 53 connected with the valve 54. The lever 53 has an extension 55 which may be actuated by the core of the solenoid 50 to operate as hereinafter described. It will be understood that the diagrammatic showing is for the purpose of illustration only and that any suitable forms of these devices might be used without departing from the spirit of the invention. The thermostatic element 52 in chamber 51 could operate a valve in make-up line 27 to increase or decrease the flow of make-up as the temperature of the discharge through pipe 45 would rise or fall; the object being to conserve heat.

A circulating pipe system is shown at 18a, 20, and 21a. The boiler water is withdrawn from the boiler drum 2 through pipe 18a and flows thence through valve 20a, pipe 20, settling chamber 21 and thence through pipe 21a back to the boiler. This circulation can be induced by mechanical means, the force due to the circulation within the boiler, or by the fact that the decending water in the pipe 21a may be colder than the water in the boiler. The settling chamber has a larger diameter than the pipes 20 and 21a and therefore some of the suspended matter has time to settle down to the bottom of the chamber, from which point it is permanently withdrawn from the boiler system through the pipes 22 and 18.

From the foregoing description of the various parts of the device, the operation thereof may be readily understood. Let us assume that the boiler has been in operation and that the salts or other impurities are being concentrated with the apparatus arranged as indicated. Water from the boiler containing concentrated salts may be drawn off through the pipe 18a and (the valve 19 being closed and the valves 20a and 22a being open) through the pipe 20, tank 21, pipe 22 and then by the pipe 18 through the high and low temperature stages of the heat interchanger, and may be discharged through the pipe 45. Ordinarily a greater quantity of water is withdrawn from the boiler drum through the pipe 18a than is permanently withdrawn from the boiler through the pipe 18. The excess water returns through the pipe 21a to the boiler, after a part of the suspended solids have settled to the bottom of the chamber 21, where they are withdrawn through the pipe 18. By this means a small quantity of permanently withdrawn water can withdraw a relatively large amount of impurities from the boiler. While this is going on, the boiler feed line 10 (the valve 11 being closed and the valves 23a and 11a being open) will cause a flow through the pipe 23, through the high temperature stage A of the heat interchanger, and back through the pipe 10 into the boiler. Heat from the water passing from the boiler will therefore be transferred to the feed water at the high temperature stage of the heat interchanger.

To gain utmost economy and benefit of the invention, it is desirable to withdraw boiler water faster if the concentration is high, and slower if the concentration is lower. This will effect a saving in water if the concentration is low. It is known that the conductivity of water for an electric current varies with the degree of concentration of salts in the water. Advantage is taken of this fact to cause the flow of a current of electricity to be varied according to the conductivity of the boiler water and to use this current for opening and closing a valve for controlling the blow-off. Thus the water from the boiler which passes into the chamber 46 will cause a variation of current from the battery 49 in proportion to the concentration of the salts, so that, if the salts are very concentrated, the current may energize the solenoid 50 to move the arm 55 and the lever 53 which controls the valve 54, this in turn controlling the flow of water permanently withdrawn from the boiler or the "blow-off."

It is also desirable to withdraw boiler water more slowly if the discharge is warm and to withdraw it faster if the discharge is cooler. This will effect a saving of heat when the effluent is warm. In order to effect this, I make use of the thermostatic element 52 in the chamber 51. When the water in this chamber is warmer, it will cause the thermostatic element to operate, thus, if the thermostatic element elongates, it will operate the lever 53, which controls the valve 54, so as to tend to close it or to open it when the discharge is cooler.

It is also desirable to withdraw boiler water in proportion to the rate of feeding make-up water into the system, because the ratio of the rate of withdrawal to the rate of adding make-up water will approximately control the concentration, especially of soluble salts. The control of the blow-off, according to the rate of flow of boiler feed, would not regulate the concentration, because the quantity of make-up water practically never bears a fixed ratio to the quantity of boiler feed.

While the water containing the concentrated salts is being discharged from the boiler, cold water from the supply pipe 13 is being passed into the softener 25, valve 13a being closed, through the valve 26, thence through the orifice 38 of the casing 36, and past the valve 31 through the pipe 27 into the low temperature stage B of the heat interchanger. While I have spoken of this as the low temperature stage, it is understood that the temperature of the entering blow-off water may be approximately 212° F. Heat, therefore, is rapidly transferred to the cold water, which, on passing through the pipe 28, make-up storage 29, and past the valves 30 and 14 into the feed water heater 6, is boiled, thereby releasing the dissolved or suspended gases which then may pass up through the vent 6a.

The water thus relieved of its gases, together with condensed steam returns, which enter the heater through the pipe 7, and together with the water that is condensed from the steam which enters the heater through the pipe 8, is forced by the boiler feed pump 9 through the pipe 10, into the high temperature stage A of the heat interchanger, by the pipe 23, as heretofore described. Here the water is heated to a higher temperature by the water withdrawn from the boiler and then enters the boiler through the pipe 10, as stated. The flow of make-up water and blow-off water is controlled automatically by the difference in pressure on the two sides of the orifice 38 in the casing 36. This casing communicates, as stated, with a casing 56 by means of the pipes 34 and 35 in such a manner that the pressure on opposite sides of the orifice 38 is reproduced in the casing 56 on opposite sides of the diaphragm 33. When the drop in pressure through the orifice grows greater, the diaphragm 33 moves to open the valves 31 and 32, which, as stated, control the inflow of the make-up water as well as the outflow of the boiler water. When the drop in pressure through the orifice grows less, then the valves close or restrict their openings.

The valves 31 and 32 may also be controlled by the float 15, for it is obvious that when the float rises with the water which has entered the heater 6, the movement of the float would be communicated through the rod 40, lever 41, link 42, and lever 43 to the valve stem 39 to close the valve, while, when the water lowers, it will open the valve.

The water is preferably withdrawn through pipe 22 from the bottom of settling chamber 21, where the concentration of precipitated matter is greater than the average in circulation in the boiler. The controlling of the rate of withdrawal according to the rate of feeding the make-up will maintain the concentration at an approximately fixed degree, but in cases where the degree should change then the control of the rate of withdrawal according to the degree of concentration will take place. If while these other controls are functioning the discharge should become warm, then the outlet valve will reduce the rate of withdrawal. It will thus be seen that by the means outlined there will be a minimum of water withdrawn from the boiler and a minimum of heat lost in the withdrawn water, in maintaining automatically the concentration at a minimum desired degree.

In cases where the utmost accuracy in the maintenance of a fixed degree of concentration is not required the concentration control can be omitted. Or if heat economy with only a moderate degree of control of the concentration is desired then the thermostatic valve only may be used, or if only approximate concentration control is wanted the withdrawal and make-up streams can have their flow ratio controlled. In other words, one or more of the controls can be omitted. The controls may be of any type to accomplish the desired purpose. For example, the thermostatic valve may be of any suitable type and may be set to operate at any suitable temperature so as to open the exit to the waste pipe at temperatures below any predetermined desired temperature, and to close the exit if the outgoing boiler water at the exit is hotter than this pre-determined desired temperatures. The flow of make-up water may be controlled manually by means of the by-pass valve 17.

As a specific example, the make-up water may enter the low temperature stage at about 60° F., and leave it usually at about 100° F., but may leave it at 212° F. as an upper limit. The outgoing boiler water entering the high temperature stage would enter at boiler temperature, which would be about 350° F. if the pressure were 125 pounds, and it would leave the high temperature stage at a temperature approaching 212° F. as a lower limit. The feed water flowing in the opposite direction through the high temperature stage would enter at about 212° F. (if the steam in the deaerator is at atmospheric pressure) and would leave the heat exchanger and enter the boiler at usually about 220° F., but may reach the boiler temperature as an upper limit, which would be about 350° F., if the pressure were 125 pounds.

Let us assume that the concentration of soluble salts in the water within the boiler is to be maintained at 50 grains per gallon and that the make-up water contains 10 grains per gallon of permanently soluble salts. It is evident that the rate of withdrawal of water must be at one fifth the rate of feeding make-up, because the concentration in the outgoing water will be five times that of the make-up water, and one fifth of a gallon of outgoing water will contain the same quantity of impurity as one gallon of make-up water. It is evident that if impurities are removed at the same rate they are being added that the concentration will remain constant. In other words, the degree of concentration of permanently soluble salts in the boiler as compared with the same in the make-up, will be in the same ratio as the quantity of make-up fed bears to the quantity of water withdrawn from the boiler. Thus:—If the boiler water concentration is five times the concentration of the make-up, then the average quantity of make-up fed is five times the average quantity of boiler water withdrawn. This is true if all the impurities remain in the water. If the impurities settle out of the water in the boiler, the concentration will be further reduced.

It will thus be seen that I have provided a process and apparatus by means of which water in the boiler may be continually purified, first, by removing gases from the boiler feed water, and allowing of other treatment like filtering or chemical dosing in the heater, and second, by introducing to the boiler a substantial quantity of make-up water, containing a relatively small quantity of foreign matter, in excess of that required for the replacement of boiler feed and steam circuit losses, and permanently removing a substantially equal quantity of concentrated boiler water containing a relatively large amount of foreign matter. Relatively little heat is lost because the water discharged from the boiler gives up its heat to the incoming feed water and added make-up water.

The advantages of using a two stage heat interchanger are: First, it provides between the low temperature stage and the high temperature stage an opportunity; (a) to improve the condition of the water such as to de-aerate it, filter it, chemically treat it, settle it, etc.; (b) to join it to the condensed steam returns, which generally constitute the main body of boiler feed water; (c) to heat it further by exhaust or other waste steam, thereby conserving heat. Second, (a) the two stage arrangement provides a means whereby the make-up is heated to usually very much less than 212° F. in the low temperature stage, and the boiler feed water is heated to not much higher than 212° F. in the high temperature stage where the returns constitute the major part of the boiler feed stream, thus preventing the precipitation of scale in the heat exchanger; (b) the boiler feed ordinarily consisting mainly of condensate returns can be used for cooling the outgoing water, thus relieving the make-up water of about half of the required cooling and about doubling the capacity of the heat exchanger for cooling; (c) by cooling with make-up only in the second stage the withdrawn water can be cooled to approximately the same temperature as the cold make-up water; (d) by cooling only with make-up in the second stage an opportunity is provided to control the outgoing boiler water by means of the make-up water or vice versa, that is, the rate of flow of one can be used to control the rate of flow of the other.

It will be understood that foreign matter in the boiler water may be in solution or in suspension or may be in flocculent or other forms.

All water containing foreign matter in any of these forms is referred to as concentrated, the word "concentration" being used generically to indicate the presence of a comparatively large quantity of foreign matter, whether or not such matter is in solution. It will be obvious that the method and apparatus herein disclosed and claimed is adapted to decrease the proportion of such foreign matter in the boiler water regardless of the form of the foreign matter and by "purification" I mean the elimination of foreign matter from the water regardless of its form.

Due to the fact that steam tends to form upon the surfaces of undissolved foreign matter in the boiler water and thereby to lift such foreign matter toward the top of the boiler, the system as disclosed herein is assisted in its functioning by the concentration of impurities in the upper portion of the boiler and such concentration may be further effected, if desired, by circulating the boiler water from the top of the boiler through the settling chamber 21 as described herein.

I claim:

1. The combination with a boiler, of a heat interchanger, means for conducting water from the boiler to the heat interchanger, a feed water line leading to said boiler and arranged to receive heat from said heat interchanger, a make-up water line arranged to receive heat from said heat interchanger and subsequently connected with said feed water line, and means for automatically controlling the withdrawal of the water from the boiler in proportion to the rate of flow of the make-up water.

2. The combination with a boiler, of a heat interchanger, means for conducting water from the boiler to the heat interchanger, a feed water line leading to said boiler and arranged to receive heat from said heat interchanger, a make-up water line arranged to receive heat from said heat interchanger and subsequently connected with said feed water line, and means for automatically controlling the rate of flow of make-up water in proportion to the rate of withdrawal of the water from the boiler through the heat interchanger.

3. The combination of a boiler, means for withdrawing water from the boiler, a heat interchanger, means for passing the water withdrawn from the boiler through the heat interchanger and permanently and wholly discharging it unmixed with other water, a feed water line leading to the boiler through a relatively high temperature portion of said heat interchanger, a source of condensate connected with said feed water line, a make-up water line passing through a relatively low temperature portion of said heat interchanger and connected with said feed water line in advance of the passage of said feed water line through said interchanger, and means for controlling the flow of the water discharged from the heat interchanger in a reverse proportion to its temperature.

4. The combination with a boiler, of means for withdrawing water from the boiler, a heat interchanger, means for passing the water withdrawn from the boiler through said heat interchanger and for discharging it, a source of make-up water, means for connecting said source with said heat interchanger for heating the make-up water by the water withdrawn from the boiler, means for introducing the heated make-up water into the boiler and means for simultaneously controlling the passage of the make-up water into the heat interchanger and the discharge of boiler water from said heat interchanger.

5. The combination with a boiler, of means for withdrawing water from the boiler, a heat interchanger, means for passing the water withdrawn from the boiler through said heat interchanger and for discharging it, a source of make-up water, means for connecting said source with said heat interchanger for heating the make-up water by the water withdrawn from the boiler, a de-aerator for receiving the heated make-up water, means for conducting the de-aerated make-up water to the boiler, a float in said de-aerator, and means actuated by the float for simultaneously controlling the discharge of boiler water from the heat interchanger and the passage of make-up water to the heat interchanger.

6. The herein described process of purifying water within a boiler, which consists in permanently withdrawing water from the boiler, heating make-up water by the water withdrawn from the boiler, passing said make-up water to a feed water line, diluting said make-up water in the feed water line with water substantially free of impurities, subsequently delivering to the feed water an additional quantity of heat from water so withdrawn and introducing the heated feed water into the boiler.

7. The herein described process of purifying water within a boiler, which consists in permanently withdrawing from the boiler water containing foreign matter in concentrated form and replacing the water thus withdrawn by make-up water containing foreign matter in less quantities, the rate of withdrawal and replacement of boiler water with make-up as aforesaid being sufficiently rapid, taking boiler temperatures, boiler load and make-up water impurities into account, to maintain boiler concentration below the point of substantial scale deposit while safeguarding against undue waste of boiler water after having attained said point of concentration.

8. The herein described process of purifying water within a boiler, which consists in permanently and wholly withdrawing water from the boiler, heating previously unheated make-up water by the water withdrawn from the boiler, storing the heated make-up water for the separation of impurities therefrom, passing said make-up water to a feed water line, subsequently heating the feed water, by means of the water withdrawn from the boiler, and introducing the heated feed water into the boiler.

9. The combination of a boiler, a blow-off line leading therefrom, a chamber connected with said blow-off line for concentrating impurities, said blow-off line leading from a portion of said chamber in which foreign matter is adapted to collect, and a return conduit connecting said boiler with a portion of said chamber adapted to contain water from which impurities have settled, whereby to permit the circulation back to said boiler of partially deconcentrated water, a boiler feed line, a make-up water line leading thereto, means for cooling blow-off water containing substantially all of its boiler derived heat in said blow-off water line with water passing to the boiler through said make-up and feed water lines, while keeping the blow-off water at pressures above the flash point during its cooling whereby to return to the boiler substantially all heat of water withdrawn through a portion of said chamber in which the impurities have been concentrated, and means for wholly and permanently discharging the cooled blow-off concentrate so withdrawn.

10. The herein described process of deconcentrating boiler water without substantial heat losses, which consists in withdrawing relatively concentrated water from the boiler, preliminarily cooling said water and imparting the heat derived therefrom to the boiler feed, then further delivering heat from said withdrawn water while it is under pressures materially in excess of atmospheric to a quantity of undiluted make-up water, feeding the heated make-up water to the boiler, and wholly discharging substantially all the cooled water so withdrawn.

11. The herein described process of deconcentrating boiler water without substantial heat losses, which consists in withdrawing relatively concentrated water from the boiler, preliminarily cooling said water and imparting the heat derived therefrom to the boiler feed, then further delivering heat from said withdrawn water while it is under pressures materially in excess of atmospheric to a quantity of undiluted make-up water, exposing the heated make-up water to substantially atmospheric pressures for the release of gases driven therefrom by the heat, feeding the heated make-up water to the boiler, and wholly discharging substantially all the cooled water so withdrawn.

12. The herein described process of deconcentrating boiler water, which consists in adding to the return feed water a quantity of make-up water materially in excess of replacements required for losses in the boiler water and steam system, withdrawing a quantity of concentrated boiler water substantially equal to the excess quantity of make-up water, delivering heat from the water so withdrawn first to the feed water and secondly to the make-up water, and permanently discharging the cooled water so withdrawn.

13. The herein described process for deconcentrating boiler water without substantial heat losses, which consists in withdrawing from the boiler a quantity of concentrated water, collecting condensate for delivery to the boiler, adding to the condensate to comprise feed water a quantity of make-up water sufficiently in excess of boiler system losses to replace the amount of concentrated water so withdrawn, cooling the withdrawn boiler water approximately to the atmospheric boiling point by delivery of heat therefrom to the boiler feed water, further cooling the withdrawn water by heating the make-up water prior to its commingling with said condensate for driving gas therefrom, exposing the make-up water to substantially atmospheric pressure to permit the escape of such gas, and permanently discharging the cooled and relatively concentrated boiler water so withdrawn.

14. The herein described method of deconcentrating boiler water, which consists in the partial heating of raw make-up water by means of concentrated water withdrawn from the boiler, the dilution of the partially heated make-up water with condensate boiler return feed water, the further heating of the mixture of make-up and feed water, and the permanent blow-off of all the concentrated boiler water so withdrawn.

15. The combination with a boiler of a heat interchanger having a high temperature stage and a low temperature stage, means for withdrawing water from the boiler and delivering it to the high temperature stage, means for delivering the said withdrawn boiler water from the high temperature stage to the low temperature stage, a source of make-up water, means for delivering make-up water from said source to the low temperature stage of the heat interchanger, means for diluting partially heated make-up water with substantially pure water upon its delivery from the low temperature stage of the interchanger and conveying the diluted water to the high temperature stage of the heat interchanger, means for delivering the water from the high temperature stage into the boiler.

16. The combination with a boiler and a valve controlled blow-off pipe communicating with said boiler and terminating for the permanent discharge therethrough of blow-off water issuing from said pipe, of a heat interchanger communicating with said pipe for the passage therethrough of blow-off water traversing said pipe, means for supplying said boiler with water through said heat interchanger, whereby the water so supplied will derive heat from said blow-off water, means for collecting impurities in the output of said boiler for delivery without interfering with the discharge of boiler water through said pipe, and automatically operable valve actuating mechanism operatively connected with said blow-off valve and responsive to water carrying the impurities collected as aforesaid, whereby the blow-off from said boiler is in general proportion to the collection of impurities in the output thereof.

17. The combination with a boiler and a heat interchanging device operatively connected by a blow-off pipe with said boiler and having a high temperature stage and a low temperature stage, of a feed water line provided with a source of relatively pure water and leading to said boiler through one of the stages of said interchanger, and a make-up water line leading through the other stage of said interchanger to said feed water line and connected therewith prior to its passage through said interchanger, whereby make-up water heated in one stage of said interchanger will be commingled with relatively pure water in said feed water line before passing through another stage of said interchanger.

18. The combination with a boiler and a heat interchanging device operatively connected by a blow-off pipe with said boiler and having a high temperature stage and a low temperature stage, a feed water line passing through the high temperature stage of said interchanger to said boiler, a make-up water line passing through the low temperature stage of said interchanger and connected with said feed water line prior to its passage through said high temperature stage, a boiler steam pipe system including return lines for supplying condensate to said feed water line, and means for feeding raw water to said make-up water line whereby said raw water will be moderately heated in the low temperature stage of said interchanger, diluted with condensate, and subsequently heated to a relatively higher temperature in said interchanger to conserve the heat of the blow-off without precipitation in the interchanger.

19. The combination with a boiler and a source of condensate, of a feed water line leading to said boiler and connected with said source to receive condensate therefrom, a blow-off line leading from said boiler for the permanent discharge of boiler water therefrom and including a heat interchanger having a plurality of stages through one of which said feed water line passes, a make-up water line passing through another of said stages, a tank into which said make-up water line discharges and a pipe from said tank to said feed water line for delivering make-up water into the condensate in advance of its passage through said heat interchanger, whereby raw make-up water is partially heated by blow-off water, is partially purified in said tank, is diluted by condensate and subsequently additionally heated by blow-off water before delivery into said boiler.

20. The combination with a boiler and a boiler steam pipe system, including condensate returns, of a boiler blow-off pipe adapted for the permanent discharge of boiler water and provided in the course of said water with a heat interchanging device having a high temperature stage and a low temperature stage, a feed water line passing through the high temperature stage of said interchanger to receive heat therefrom and communicating with said boiler and with said condensate returns, a make-up water line passing through the low temperature stage of said heat interchanger to receive heat therefrom, and a vented tank affording communication between said make-up water line and said feed water line at a point in the latter in advance of said heat interchanger.

21. A boiler blow-off system comprising the combination with a boiler, a blow-off pipe leading therefrom, a make-up water pipe leading thereto, a heat interchanger connected with said pipes for the operative delivery of heat from blow-off water to make-up water, a source of make-up water supply, means connecting said source with said make-up water pipe including a pump for the make-up water, a valve controlling the passage of blow-off water through said blow-off water line, and means for closing said valve when the amount of make-up water delivered by said pump to the make-up water pipe is less than the amount of make-up water supplied to said pump from said source.

22. A boiler blow-off system comprising the combination with a boiler, a blow-off line leading therefrom, a make-up water line leading thereto and a heat interchanger operatively connected with said lines for the delivery of blow-off water heat to the make-up water, of means for feeding make-up water through its said line, a valve controlling the flow of make-up water through its said line, a valve controlling the passage of blow-off water through the blow-off water line, and means for moving said last mentioned valve toward its closed position when said first mentioned valve is moved toward its closed position, said means comprising a flow responsive device operatively connected to said make-up water supply means to be influenced by changing differential pressures therein occasioned by the operation of said first mentioned valve and connected with said last mentioned valve for the operation thereof responsive to changes in differential pressures.

23. The process of maintaining boiler water at a predetermined low degree of concentration which consists in delivering make-up water to the boiler in quantities sufficient to replace losses, withdrawing relatively concentrated boiler water from the boiler, replacing the water so withdrawn with additional make-up water in such quantities and at such intervals as to maintain the foreign content of the water in the boiler at a concentration sufficiently low to substantially prevent scale formation and chemical decomposition, the rate of replacement depending upon the character of the make-up, preliminarily cooling the withdrawn boiler water by the boiler feed, then delivering heat from the withdrawn boiler water to the make-up in sufficient quantities to reduce the withdrawn boiler water almost to the initial temperature of the make-up while maintaining the withdrawn water under pressure whereby to avoid loss of latent heat, and permanently discharging the cooled and replaced water so withdrawn.

24. The process of preventing boiler scale deposits which consists in replacing relatively concentrated boiler water with make-up water containing impurities in less degree, the quantity of make-up so added being in excess of that required to compensate for losses, delivering from the said boiler water to the make-up water substantially all boiler-derived heat remaining in the water to be replaced, and permanently discharging the replaced water, the rate of replacement being substantially that required to maintain the boiler water sufficiently low in concentration to substantially prevent scale deposits while avoiding loss of heat by excessive withdrawals.

25. The process of preventing boiler scale deposits which consists in replacing relatively concentrated boiler water with make-up water containing impurities in less degree, the quantity of make-up so added being in excess of that required to compensate for losses, partially cooling with warm boiler feed water the hot boiler water to be replaced, then delivering from the said boiler water to the make-up water substantially all boiler-derived heat remaining in the water to be replaced, and permanently discharging the replaced water, the rate of replacement being such as to maintain the boiler water sufficiently low in concentration to substantially prevent scale deposits.

26. The method of deconcentrating boiler water which consists in the partial heating of raw make-up water by means of concentrated water withdrawn from the boiler, and exposure of the partially heated make-up water to temperatures and pressures at which gases will discharge therefrom, the dilution of the partially heated and de-aerated make-up water with condensate boiler return feed water, the further heating of the mixture of make-up water and feed water, the delivery thereof to the boiler, and the permanent blow-off of all of the concentrated boiler water so withdrawn.

27. The method of maintaining boiler water concentration at a predetermined low value which consists in supplying to the boiler a quantity of make-up water in excess of that required to replace boiler system losses and withdrawing and permanently discharging from the boiler a quantity of relatively concentrated boiler water sufficiently large to remove from the boiler substantially the amount of impurities entering the boiler in said make-up water, and maintaining the aforesaid withdrawal of impurities at substantially the rate at which impurities enter the boiler.

28. The process of preventing boiler scale which consists in withdrawing and replacing boiler water with make-up water at such a rate as to maintain the impurities in the water in the boiler continuously below the degree of concentration at which scale forms, the make-up water being added in quantities sufficiently in excess of boiler system losses to compensate for all boiler system withdrawals, and the boiler system withdrawals being effected at such a rate as to remove in the form of concentrated boiler water substantially the same amount of impurities as are entering the boiler in the total quantity of make-up water added.

29. The process of maintaining boiler water at a low degree of concentration which consists in blowing off water from the boiler, adding make-up water to the boiler, and regulating the amount of water blown off so that it is increased or decreased in proportion to the increase or decrease in the amount of make-up water added.

30. A boiler provided with a blow-off system means for delivering condensate to the boiler means for delivering make-up water to the boiler, and means for mechanically regulating the amount of water blown off through said system so that it is increased or decreased in substantial accordance with the increase or decrease in the amount of make-up water added to the boiler.

31. A device for de-concentrating boiler water comprising the combination with a boiler and a boiler blow-off system, of means for adding make-up water to the boiler and a flow responsive device operatively associated with said means and provided with a regulatory valve in said system to which said device is connected for the regulation of boiler blow-off in accordance with make-up flow in said means.

32. The combination of a boiler and a source of make-up water supply, of a heat interchanger, means for withdrawing water from the boiler and delivering it into a portion of said heat interchanger at substantially boiler pressure, means for delivering previously unheated make-up water from said supply to another portion of said heat interchanger, means for permanently and wholly discharging from the boiler system all of the water so withdrawn from the boiler, means for charging the boiler with the heated water from said water supply, and means for automatically proportioning the rate of withdrawal of boiler water according to the rate of adding make-up water to the boiler system.

33. The process of deconcentrating boiler water which consists in supplying to the boiler make-up water of less concentration than the boiler water in quantities in excess of boiler system losses, wholly and permanently withdrawing from the boiler a quantity of boiler water, preliminarily cooling the withdrawn boiler water by the boiler feed, further delivering the heat of the boiler water so withdrawn to the make-up water supplied to the boiler, and thermostatically controlling the withdrawal of the boiler water.

34. The process of deconcentrating boiler water which consists in supplying to the boiler make-up water of less concentration than the boiler water in quantities in excess of boiler system losses, withdrawing a quantity of concentrated water from the boiler, partially cooling the water so withdrawn with boiler feed water including condensate returns, additionally cooling water thus withdrawn with the make-up water supplied to the boiler as aforesaid and controlling the rate of withdrawal of water from the boiler thermostatically in inverse proportion to its temperature, whereby the quantity of blow-off water discharged is proportioned to the quantity of make-up water supplied.

35. The combination with a boiler, of a heat interchanger having a high temperature stage and a low temperature stage, connections between the boiler and the high temperature stage of the heat interchanger, for delivering water from the boiler to the heat interchanger, a water softener, means for delivering make-up water to said water softener, connections for delivering water from the softener to the low temperature stage of the heat interchanger, a de-aerator, connections for conveying water from the low temperature stage to the de-aerator, a pump, connections leading from the de-aerator to the pump, connections from the pump to the high temperature stage of the heat interchanger, and connections from said high temperature stage for delivering the feed water into the boiler.

36. The combination with a boiler, of a heat interchanger having a high temperature stage and a low temperature stage, means for withdrawing water from the boiler and delivering it under substantially boiler pressure to the high temperature stage, means for delivering the said withdrawn boiler water at substantially boiler pressure from the high temperature stage to the low temperature stage, means for automatically increasing or decreasing the rate of withdrawal of boiler water according to the rate of adding make-up water to the system, means for permanently and wholly discharging the said withdrawn boiler water from the system, a water softener, means for delivering previously unheated make-up water to said water softener, means for delivering make-up water from the softener to the low temperature stage of the heat interchanger, a de-aerator, means for conveying make-up water from the low temperature stage to the de-aerator, a pump, means for delivering boiler feed water from the de-aerator to the pump, means for delivering boiler feed water from the pump to the high temperature stage of the heat interchanger, and means for delivering boiler feed water from the high temperature stage into the boiler, said heat interchanger being arranged to prevent the mixing of the withdrawn boiler water with the make-up water.

37. The combination with a boiler, of a heat interchanger having a high temperature stage and a low temperature stage, means for withdrawing water from the boiler and delivering it at a pressure above its boiling point to the high temperature stage, means for delivering the said withdrawn boiler water at a pressure above its boiling point from the high temperature stage to the low temperature stage, means for permanently and wholly discharging the said withdrawn boiler water from the system, a water softener, means for delivering previously unheated make-up water to said water softener, means for delivering make-up water from the softener to the low temperature stage of the heat interchanger, a de-aerator, means for conveying make-up water from the low temperature stage to the de-aerator, a pump, means for delivering boiler feed water from the de-aerator to the pump, means for delivering boiler feed water from the pump to the high temperature stage of the heat interchanger, and means for delivering boiler feed water from the high temperature stage into the boiler, said heat interchanger being arranged to prevent the mixing of the withdrawn water with the boiler feed water and said make-up water.

38. The method of conditioning water in boiler systems consisting of a softening treatment of make-up water, heating the treated make-up water, introducing the heated make-up water to the boiler system, and discharging concentrated water from the boiler system and automatically proportioning the discharge of water from the boiler system to the rate of admission of treated make-up water to the system.

39. The method of conditioning boiler water, which consists in withdrawing water from the boiler, returning to the boiler a relatively less concentrated portion of the water so withdrawn, permanently discharging from the boiler system a relatively more concentrated portion of the water so withdrawn, introducing make-up water to the boiler system at a rate in excess of boiler system losses and proportioning the rate of discharge of relatively more concentrated boiler water from the system to the rate of admission of make-up water to the system inversely in the ratio of the relative concentration of the discharged boiler water to the concentration of the make-up water whereby to maintain boiler water concentration substantially constant in the system.

40. The method of conditioning water for boiler systems, consisting in chemically treating raw make-up water and delivering the treated make-up water to the boiler system, discharging a portion of relatively concentrated boiler water from the boiler system and automatically proportioning the discharge of concentrated water from the system to the supply of chemically treated make-up water approximately in inverse ratio to the concentration of the water withdrawn with respect to the water added, whereby to maintain a substantially constant concentration of water in the boiler system.

41. The process of maintaining boiler water at a low degree of concentration which consists in blowing off water from the boiler, adding make-up water to the boiler, and mechanically proportioning the rate of blowing off boiler water to the rate of introducing make-up water in a ratio approximately inverse to the concentration of the withdrawn boiler water with respect to the make-up water, whereby the discharge of salts from the boiler will at least equal the rate of introduction of salts thereto.

ROY O. HENSZEY.